(12) United States Patent
Morimoto et al.

(10) Patent No.: US 11,861,244 B2
(45) Date of Patent: Jan. 2, 2024

(54) PRINTING SYSTEM, PRINTING CONTROL METHOD, INFORMATION PROCESSING APPARATUS, AND NON-TRANSITORY COMPUTER-READABLE RECORDING MEDIUM

(71) Applicant: FUJITSU FRONTECH LIMITED, Tokyo (JP)

(72) Inventors: Yasuhiro Morimoto, Inagi (JP); Makoto Kurihara, Inagi (JP); Keita Ishiguro, Inagi (JP); Ryotaro Takamura, Inagi (JP); Seiichi Ohki, Inagi (JP)

(73) Assignee: FUJITSU FRONTECH LIMITED, Tokyo (JP)

( * ) Notice: Subject to any disclaimer, the term of this patent is extended or adjusted under 35 U.S.C. 154(b) by 0 days.

(21) Appl. No.: 17/677,148

(22) Filed: Feb. 22, 2022

(65) Prior Publication Data

US 2022/0179598 A1    Jun. 9, 2022

Related U.S. Application Data

(63) Continuation of application No. PCT/JP2019/034412, filed on Sep. 2, 2019.

(51) Int. Cl.
*G06F 3/12* (2006.01)
*G06K 15/02* (2006.01)

(52) U.S. Cl.
CPC .......... *G06F 3/1211* (2013.01); *G06F 3/1243* (2013.01); *G06K 15/028* (2013.01)

(58) Field of Classification Search
CPC .... G06F 3/1211; G06F 3/1243; G06F 3/1208; G06F 3/1285; G06K 15/028;
(Continued)

(56) References Cited

U.S. PATENT DOCUMENTS

2010/0301111 A1* 12/2010 Nakata ............... H04N 1/00867
235/375
2013/0242323 A1   9/2013 Igarashi
(Continued)

FOREIGN PATENT DOCUMENTS

JP     60-255462 A    12/1985
JP     05084984 A     4/1993
(Continued)

OTHER PUBLICATIONS

Ryo Nakagawa et al.; "Evaluation on accuracy of text region detection in manga images using morphological operations and face detection"; Forum on Informational Technology 2017 (FIT2017); Information Processing Society of Japan, The Institute of Electronics, Informational and Communication Engineers, Sep. 5, 2017; pp. 189-190; (4 total pages; partial English translation for paragraph 4).

(Continued)

*Primary Examiner* — John R Wallace
(74) *Attorney, Agent, or Firm* — STAAS & HALSEY LLP

(57) ABSTRACT

A printing system includes a printing device including a thermal head that prints print content on a print medium; and an information processing apparatus that controls the printing device. The information processing apparatus comprises a processor configured to detect, from print image data from a server, a position of a control target portion including a specific portion in a print image corresponding to the print image data. The processor is configured to generate printing control information for printing the control target portion. The processor is configured to transmit the print image data, the position of the control target portion, and the printing control information to the printing device. The printing device executes different printing controls for the control target portion and a portion other than the control target (Continued)

portion based on the print image data, the position of the control target portion, and the printing control information.

7 Claims, 16 Drawing Sheets

(58) Field of Classification Search
CPC . G06K 15/1807; B41J 2/32; B41J 3/01; B41J 21/00; H04N 1/23
See application file for complete search history.

(56) References Cited

U.S. PATENT DOCUMENTS

| | | | |
|---|---|---|---|
| 2014/0185100 A1* | 7/2014 | Okada | G06K 15/1868 358/3.24 |
| 2016/0221363 A1* | 8/2016 | Bae | B41J 3/4075 |
| 2018/0354257 A1* | 12/2018 | Watanabe | B41J 3/46 |
| 2019/0102590 A1* | 4/2019 | Musiani | G06K 7/1417 |
| 2019/0332377 A1* | 10/2019 | Kajikawa | G06F 9/3004 |
| 2019/0347055 A1* | 11/2019 | Murata | G06F 3/1263 |
| 2020/0042842 A1* | 2/2020 | Nakamura | G06K 15/1822 |

FOREIGN PATENT DOCUMENTS

| | | |
|---|---|---|
| JP | 2006-042035 A | 2/2006 |
| JP | 2006-168086 A | 6/2006 |
| JP | 2012-009926 A | 1/2012 |
| JP | 2013-190910 A | 9/2013 |
| JP | 2013-205703 A | 10/2013 |
| JP | 2014-131277 A | 7/2014 |
| JP | 2014-166724 A | 9/2014 |
| JP | 2014-237237 A | 12/2014 |

OTHER PUBLICATIONS

Notice of Reasons for Refusal, dated Aug. 30, 2022 in corresponding Japanese Patent Application No. 2021-543808 (5 pages) (6 pages English Translation).
International Search Report (Form PCT/ISA/210); dated Oct. 15, 2019 in corresponding PCT Application No. PCT/JP2019/034412 (3 pages) (2 pages English Translation).
Written Opinion (Form PCT/ISA/237); dated Oct. 15, 2019 in corresponding PCT Application No. PCT/JP2019/034412 (5 pages).
Notice of Reasons for Refusal, dated Jan. 31, 2023 in corresponding Japanese Patent Application No. 2021-543808 (6 pages) (5 pages English Translation).

* cited by examiner

PRINTING SYSTEM, PRINTING CONTROL METHOD, INFORMATION PROCESSING APPARATUS, AND NON-TRANSITORY COMPUTER-READABLE RECORDING MEDIUM

CROSS-REFERENCE TO RELATED APPLICATION

This application is a continuation application of and claims the benefit of priority of the prior PCT Patent Application No. PCT/JP2019/034412, filed on Sep. 2, 2019, the entire contents of which are incorporated herein by reference.

FIELD

The present invention relates to a printing system, a printing control method, an information processing apparatus, and a non-transitory computer-readable recording medium.

BACKGROUND

For example, in supermarkets and retail stores, there is a receipt printing device that issues a receipt by cutting it out from continuous paper. In such a receipt printing device, a drive mechanism is driven by a stepping motor so that strip-shaped continuous paper held in the shape of a roll has predetermined information printed thereon, is cut out to a length as needed, and is issued as a receipt.

Furthermore, there are for example an airline boarding pass that describes boarding information such as destination, flight number, and seat number, and a baggage tag that describes baggage information such as destination of a flight baggage and flight number and that is attached to a baggage so as to be used as a sign when transporting or delivering the baggage. Air boarding passes and baggage tags may also be printed by a printing device similar to a receipt printing device that issues receipts.

In the printing device such as a receipt printing device, a heated thermal head is applied to a print medium such as thermal paper to print on the print medium. In the printing device, for example, the print data specified by a host computer is developed into print image data, and the print content corresponding to the developed print image data is printed on the print medium at the specified print speed and print density.

However, in the printing device, when the print medium such as thermal paper has a poor quality and produces poor color, print blurring occurs at the default print speed. Therefore, for example, when a barcode, or the like, is printed on the print medium, the reading rate of the barcode, or the like, becomes lowered. Thus, in conventional printing devices, the print density is increased to improve the print quality, and when there is no improvement, the print speed is decreased for printing.

Patent Literature 1: Japanese Unexamined Patent Publication No. 2006-168086
Patent Literature 2: Japanese Unexamined Patent Publication No. 05-84984
Patent Literature 3: Japanese Unexamined Patent Publication No. 2014-166724
Patent Literature 4: Japanese Unexamined Patent Publication No. 2014-237237
Patent Literature 5: Japanese Unexamined Patent Publication No. 2014-131277

In recent printing devices, for example, print image data is directly received from a server, and the print content corresponding to the print image data is printed on a print medium. However, in the printing device, it is not possible to specify the position of a specific portion such as barcode or logo from the print image data. Therefore, it is difficult to specify the position of the specific portion such as barcode or logo from the print image data and adjust the print speed or the print density of the specified position. As a result, when printing is executed from the print image data including the specific portion, the print quality of the specific portion may be decreased.

SUMMARY

According to an aspect of an embodiment, a printing system includes a printing device including a thermal head that prints print content on a print medium; and an information processing apparatus that controls the printing device. The information processing apparatus comprises a processor configured to detect, from print image data from a server, a position of a control target portion including a specific portion in a print image corresponding to the print image data. The processor is configured to generate printing control information for printing the control target portion. The processor is configured to transmit the print image data, the position of the control target portion, and the printing control information to the printing device. The printing device executes different printing controls for the control target portion and a portion other than the control target portion based on the print image data, the position of the control target portion, and the printing control information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

An embodiment of a printing system, and the like, disclosed in the present application is described below in detail with reference to the drawings. Further, the disclosed technology is not limited to the present embodiment. Moreover, embodiments illustrated below may be combined as appropriate as long as there is no inconsistency.

Embodiment

Configuration of Printing System 1

Figure 1:
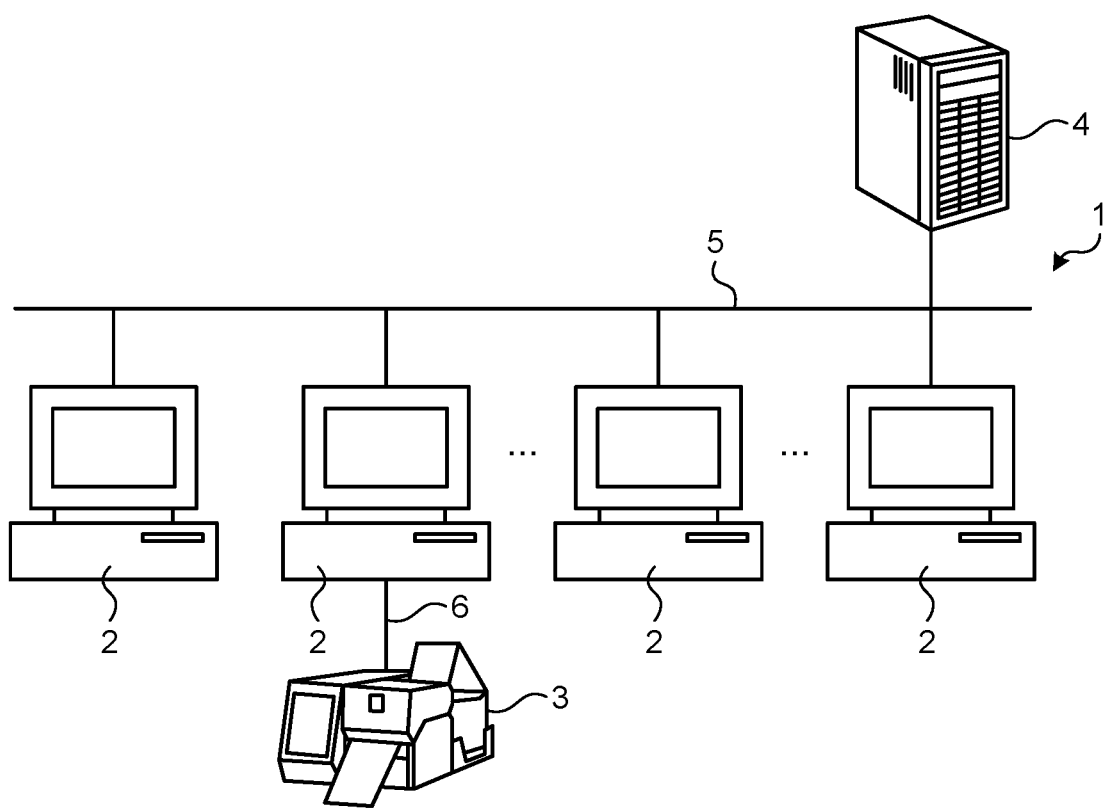
FIG. 1 is an explanatory diagram illustrating an example of a printing system according to the present embodiment.

FIG. 1 is an explanatory diagram illustrating an example of the printing system 1 according to the present embodiment. The printing system 1 illustrated in FIG. 1 includes a plurality of information processing apparatuses 2, a printing device 3, a server 4, a LAN (Local Area Network) 5, and a USB (Universal Serial Bus) 6. The information processing apparatus 2 is communicatively connected to the server 4 via, for example, the LAN 5. The information processing apparatus 2 is, for example, a computer such as a personal computer. The printing device 3 is communicatively connected to the information processing apparatus 2 via, for example, the USB 6 and is, for example, a printer device such as an airline printer that prints out print content such as an air boarding pass and a baggage tag. Further, for convenience of explanation, the printing device 3 is communicatively connected to the information processing apparatus 2 via the USB 6 in the case described, but it may be connected in parallel and may be changed as appropriate. Moreover, the printing device 3 is connected to the information processing apparatus 2 by wire in the case described, but it may be connected wirelessly and may be changed as appropriate. The server 4 is, for example, a host computer such as an airport server that manages the overall printing system 1.

Configuration of Printing Device 3

Figure 2:
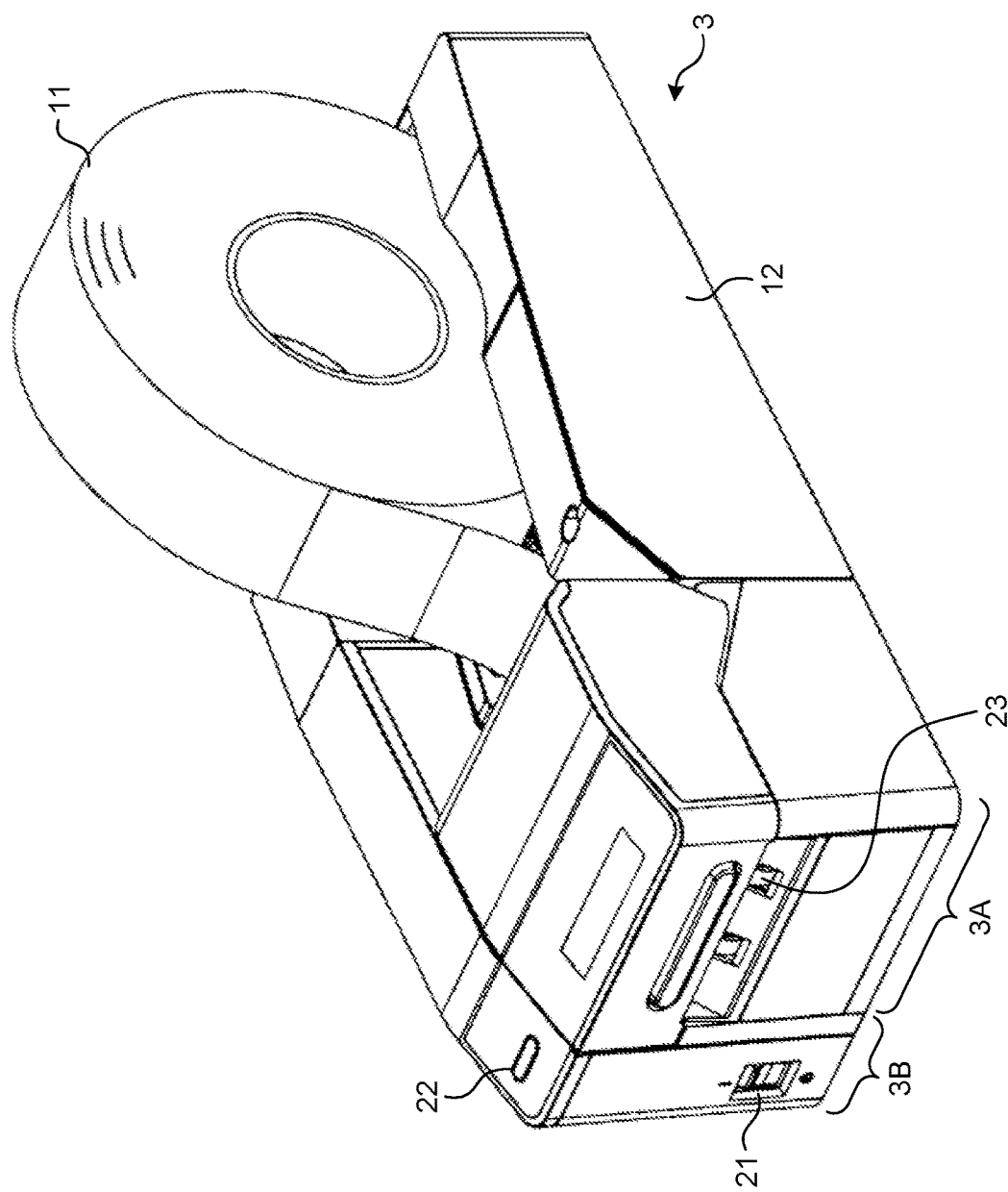
FIG. 2 is a perspective view illustrating an example of a printing device.

FIG. 2 is a perspective view illustrating an example of the printing device 3. The printing device 3 illustrated in FIG. 2 includes a printer unit 3A and a control unit 3B. A roll paper stand 12 where roll-shaped roll paper 11, which is a print medium (e.g., thermal paper), is placed may be connected and installed on a back surface of the printer unit 3A. Further, instead of the roll paper stand 12, it is also possible to connect a fanfold paper tray where a print medium such as continuously folded fanfold paper is placed.

The control unit 3B has a power switch 21 provided on a front surface and has an operating unit 22 provided on an upper surface. The power switch 21 switches on/off the power of the printing device 3. The operating unit 22 includes an operation switch to operate the printing device 3 and a status display LED that displays the status of the printing device 3. For example, the status display LED lights up when an error occurs or lights up when the roll paper 11 or the fanfold paper runs out. The control unit 3B has an ejection roller 23 provided on the front surface. The ejection roller 23 ejects the printed roll paper 11 from the printer unit 3A.

Figure 3:
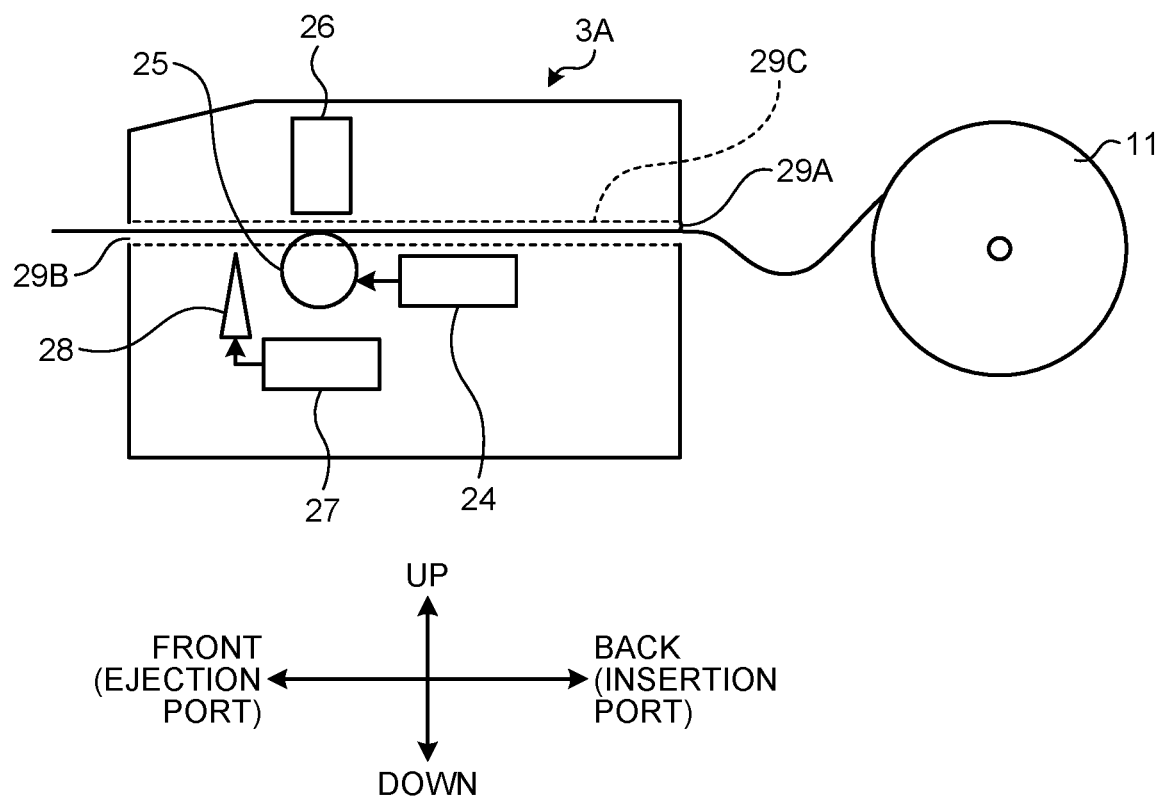
FIG. 3 is an explanatory diagram illustrating an example of an internal configuration of the printing device.

FIG. 3 is an explanatory diagram illustrating an example of an internal configuration of the printing device 3. The printer unit 3A includes the operating unit 22, the ejection roller 23, a conveyance motor 24, a platen roller 25, a thermal head 26, a cutter drive motor 27, a cutter 28, and the like. The printer unit 3A has an insertion port 29A provided on a back side and has an ejection port 29B provided on a front side. Furthermore, a conveyance path 29C is formed between the insertion port 29A and the ejection port 29B.

The insertion port 29A has a print medium, such as the roll paper 11 or fanfold paper, inserted from the roll paper stand 12 or the fanfold paper tray. The ejection port 29B ejects a baggage tag or an air boarding pass as a print medium having print content printed thereon due to the rotational force of the ejection roller 23. The conveyance path 29C conveys the print medium inserted through the insertion port 29A to the ejection port 29B. The conveyance motor 24 rotates the platen roller 25. The platen roller 25 is rotated by the conveyance motor 24 to convey the print medium inserted through the insertion port 29A to the ejection port 29B via the conveyance path 29C. The thermal head 26 selectively generates heat from a plurality of heating elements arranged in a line to print the print content on the print medium that reacts with heat.

The cutter drive motor 27 performs operations to move the cutter 28 up and down. The cutter 28 is moved up and down by the cutter drive motor 27 to cut the print medium having the print content printed thereon to a predetermined size so as to form a baggage tag, or the like. The ejection roller 23 pinches a printed baggage tag, or the like, with an opposing pinch roller and ejects it through the ejection port 29B.

Figure 4:
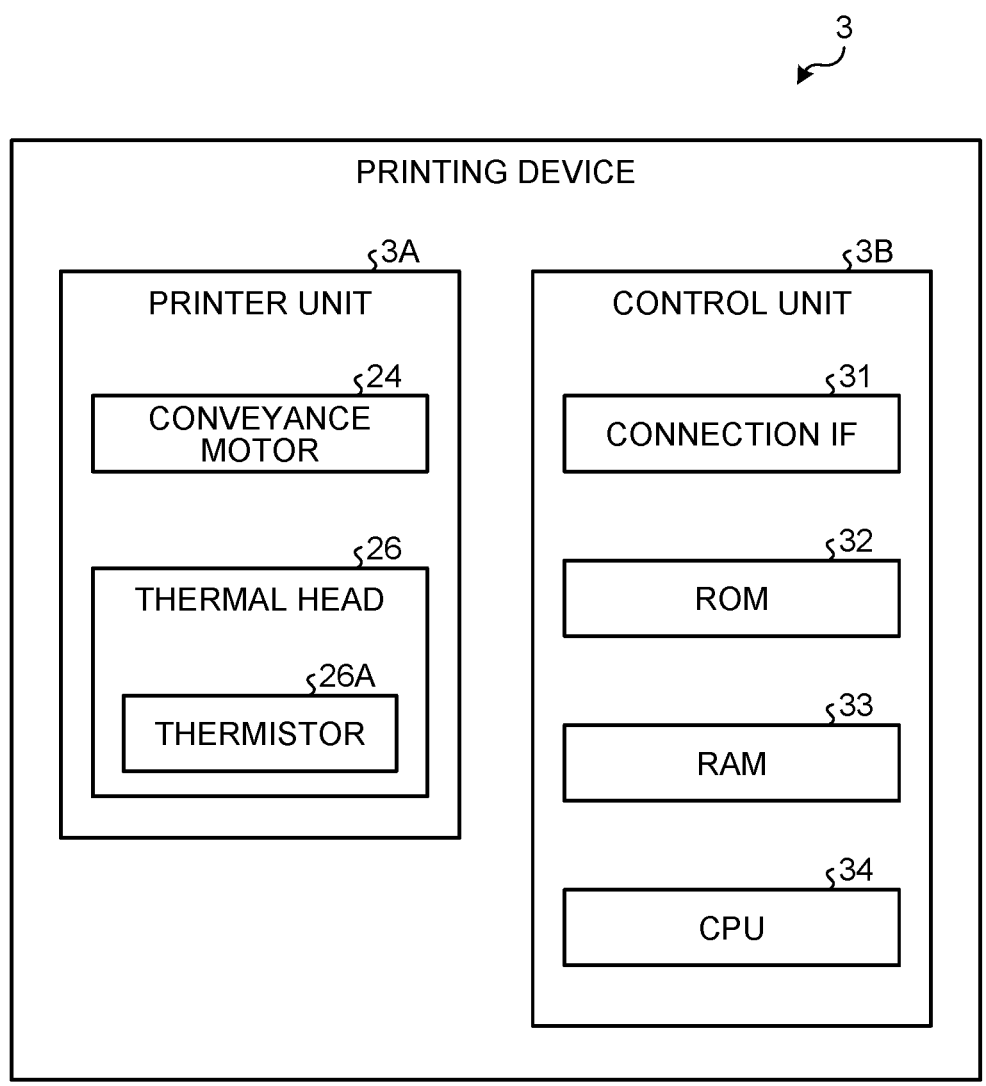
FIG. 4 is an explanatory diagram illustrating an example of a hardware configuration of the printing device.

FIG. 4 is an explanatory diagram illustrating an example of a hardware configuration of the printing device 3. The printer unit 3A illustrated in FIG. 4 includes the conveyance motor 24 and the thermal head 26. The thermal head 26 includes a thermistor 26A that detects the ambient temperature of any heating element in the thermal head 26. The thermistor 26A outputs an AD conversion value of a detection signal of the ambient temperature of the heating element. The control unit 3B includes a connection IF (Interface) 31, a ROM (Read Only Memory) 32, a RAM (Random Access Memory) 33, and a CPU (Central Processing Unit) 34. The connection IF 31 is an interface for communicatively connecting to the information processing apparatus 2 via the USB 6.

The ROM 32 stores table data, and the like, for executing each function of the printing device 3 in addition to a printing program executed by the printing device 3. For example, it stores a control program for printing a desired drawing design on a print medium by the thermal head 26 driven by a head drive circuit and data such as print data, size information, and print font for characters, symbols, pictograms, and the like, included in the drawing design to be printed.

The RAM 33 serves as an input data memory that stores print information such as information specifying characters, symbols, pictograms included in the desired drawing design to be printed, the sizes thereof, and character intervals, and the size of a printed material to be created. Further, the RAM 33 functions as a data memory that stores print image data that is generated based on the input print information and that represents the desired drawing design. Further, the print image data is data such as a print image corresponding to the print content. Further, the RAM 33 includes a register, a counter, and the like, which temporarily stores data needed for printing processing, etc., for example, the position of a specific portion and printing control information on each position. Moreover, the specific portion is, for example, a portion such as a logo or a barcode for which high-quality printing of a print image is needed. The CPU 34 controls the overall printing device 3. For example, the CPU 34 loads the print program stored in the ROM 32 into the RAM 33 and executes printing control on the print medium based on the loaded print program.

Configuration of Information Processing Apparatus 2

Figure 5:
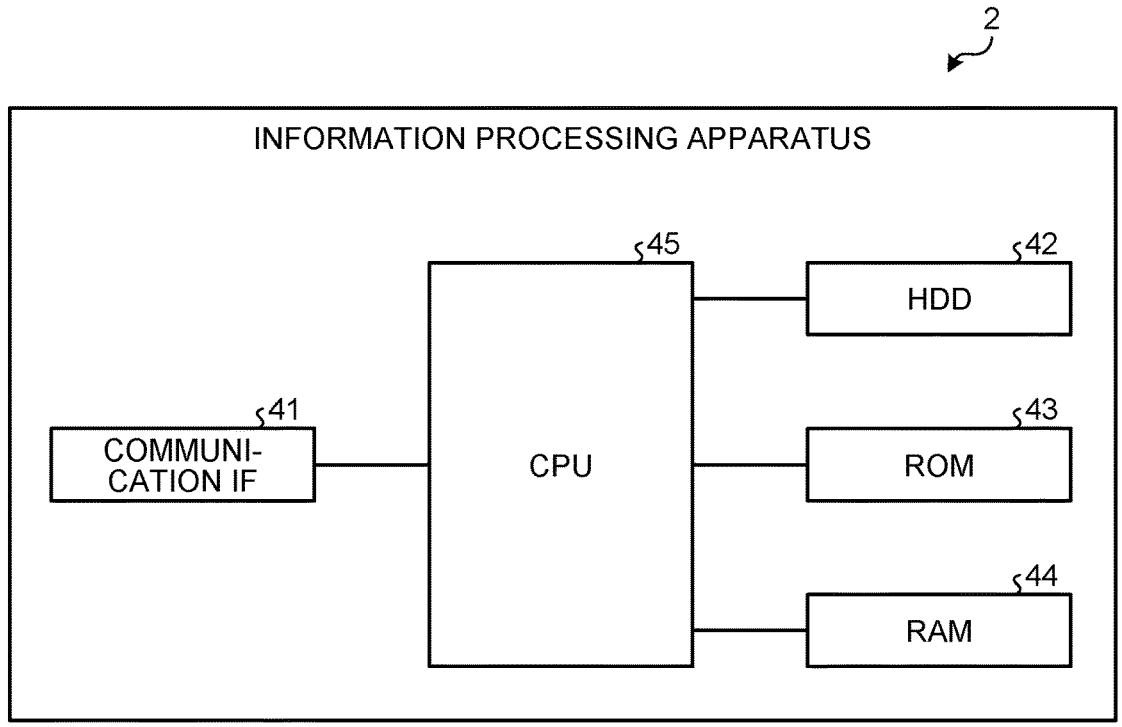
FIG. 5 is an explanatory diagram illustrating an example of a hardware configuration of an information processing apparatus.

FIG. 5 is an explanatory diagram illustrating an example of a hardware configuration of the information processing apparatus 2. The information processing apparatus 2 illustrated in FIG. 5 includes a communication IF 41, an HDD (Hard Disk Drive) 42, a ROM 43, a RAM 44, and a CPU 45. The communication IF 41 is an interface that communicatively connects to the server 4 via the LAN 5 and communicatively connects to the printing device 3 via the USB 6. The HDD 42 is an area that stores various types of information. The ROM 43 is an area that stores various programs. The RAM 44 is an area that stores various types of information. The CPU 45 controls the overall information processing apparatus 2.

Figure 6:
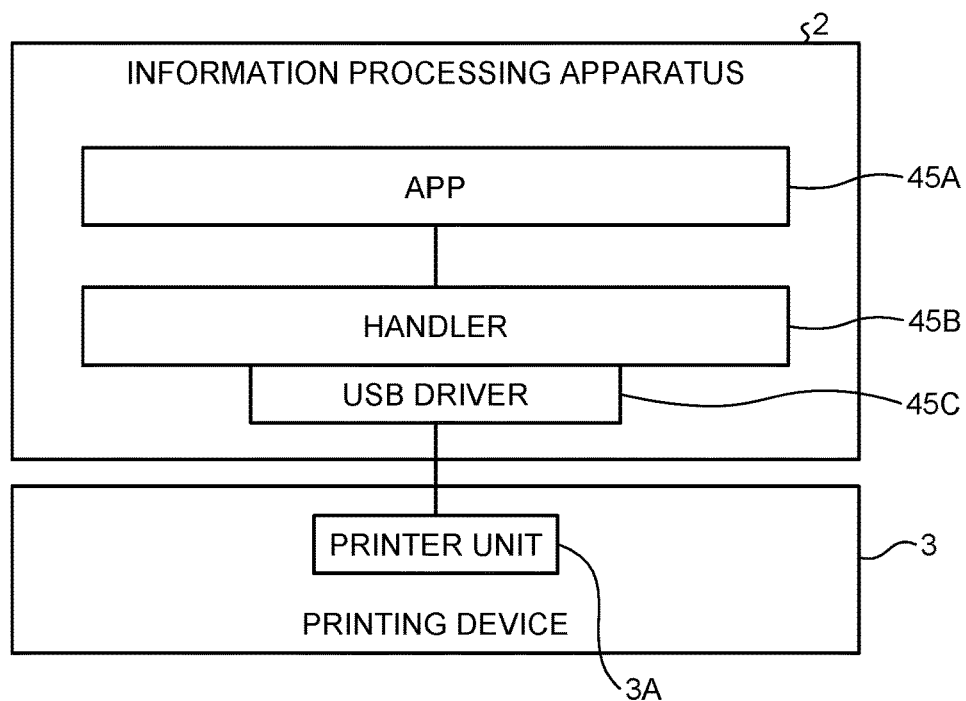
FIG. 6 is an explanatory diagram illustrating an example of a software configuration of the printing system.

FIG. 6 is an explanatory diagram illustrating an example of a software configuration of the printing system 1. The printing system 1 illustrated in FIG. 6 includes the information processing apparatus 2 and the printing device 3. Software on the CPU 45 in the information processing apparatus 2 includes an application (hereinafter simply referred to as app) 45A, a handler 45B, and a USB driver 45C. Further, it is assumed that the ROM 43 stores the app 45A, the handler 45B, and the USB driver 45C. The app 45A is a customer application for transmitting and receiving customer data, or the like, from the server 4. The handler 45B is a service module that converts a command from the app 45A into a command of the printer unit 3A in the printing device 3. The handler 45B detects the coordinate position of a specific portion, such as barcode or logo, from the print image data acquired from the server 4 and generates printing control information for each coordinate position. The USB driver 45C is a driver that drives the printer unit 3A in the printing device 3.

Figure 7:
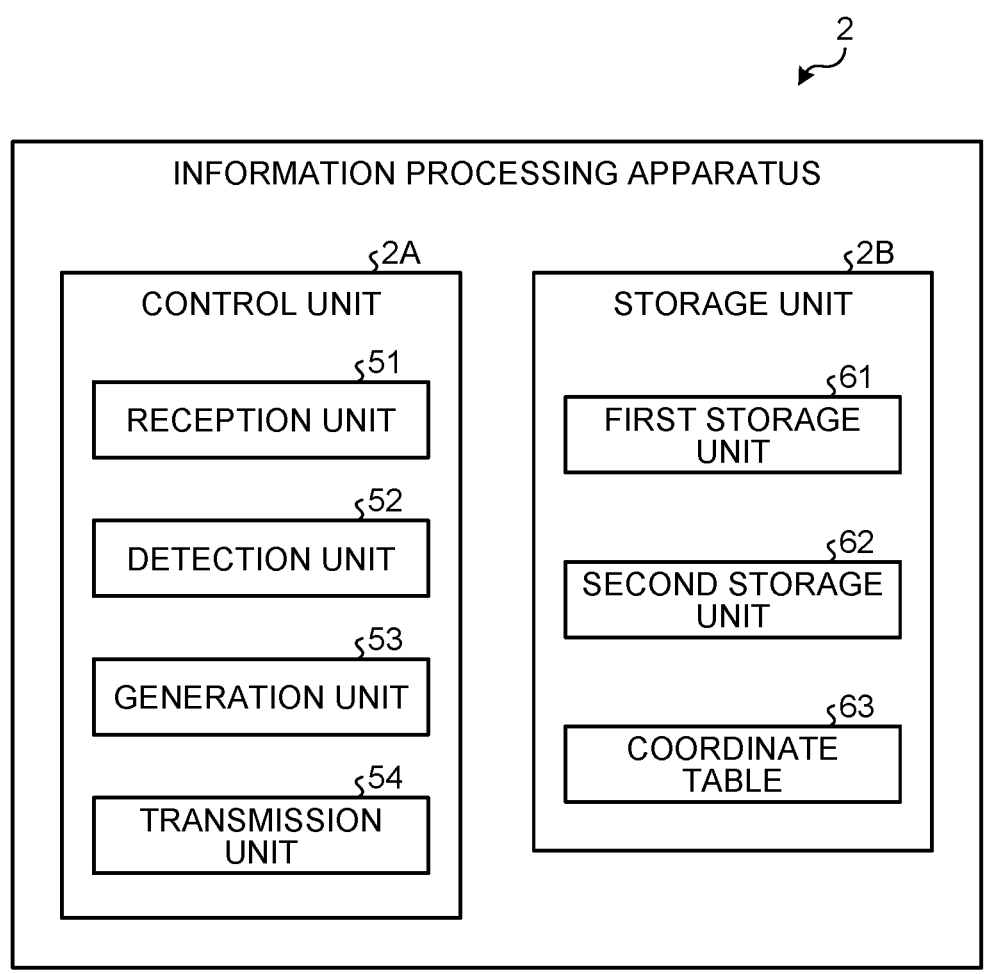
FIG. 7 is an explanatory diagram illustrating an example of a functional configuration of the information processing apparatus.

FIG. 7 is an explanatory diagram illustrating an example of a functional configuration of the information processing apparatus 2. The information processing apparatus 2 illustrated in FIG. 7 includes a control unit 2A and a storage unit 2B. The control unit 2A loads the printing control program stored in the ROM 43 into the RAM 44 and executes the loaded printing control program to execute it as a function of a printing control process. The control unit 2A includes, as functional configurations, a reception unit 51, a detection unit 52, a generation unit 53, and a transmission unit 54. The storage unit 2B includes a first storage unit 61, a second storage unit 62, and a coordinate table 63. The control unit 2A controls the overall information processing apparatus 2. The storage unit 2B stores various types of information. The reception unit 51 receives the customer data including the print image data to be printed from the server 4 via the LAN 5. The detection unit 52 detects, from the print image data, the coordinate position of the specific portion such as barcode or logo and detects the coordinate position of a control target portion described below from the coordinate position of the specific portion. The generation unit 53 generates printing control information, e.g., the print speed and the print density, for each coordinate position of the control target portion. Further, the printing control information is control information used for printing control of the coordinate position of the control target portion. The printing control information is, for example, control information such as a print speed lower than the default print speed and a print density higher than the default print density. The detection unit 52 stores the printing control information for each coordinate position of the control target portion in the coordinate table 63. The transmission unit 54 transmits the coordinate position of the control target portion including barcode, logo, etc., and the printing control information and the print image data for each coordinate position of the control target portion to the printing device 3 via the USB 6.

The detection unit 52 binarizes each pixel of the print image corresponding to the print image data in black and white and executes a morphology conversion process on each pixel after binarization. The detection unit 52 extracts the contour of the specific portion from the pixels after the morphology conversion process based on a similar condition that is similar to the specific portion. Further, when the specific portion is a barcode, the similar condition is a barcode threshold with which it may be assumed that the horizontal and vertical size of the contour is the horizontal and vertical size of a barcode. Further, when the specific portion is a logo, the similar condition is a logo threshold with which it may be assumed that the horizontal and vertical size of the contour is the horizontal and vertical size of a logo. When an extraction contour corresponding to the similar condition is extracted from the extraction contours after the morphology conversion process, the detection unit 52 stores the coordinate position of the extraction contour corresponding to the similar condition in the first storage unit 61. The detection unit 52 detects the contour as the coordinate position of the specific portion when the duty ratio between one value (black) and the other value (white) out of two values for each pixel of the extraction contour stored in the first storage unit 61 is equal to or more than the duty threshold. The detection unit 52 stores the coordinate position of the extraction contour whose duty ratio is equal to or more than the duty threshold in the second storage unit 62. Then, the detection unit 52 detects the coordinate position of the control target portion from the coordinate position of the extraction contour stored in the second storage unit 62 based on a single condition described below and stores the coordinate position of the control target portion in the coordinate table 63.

The first storage unit 61 stores the coordinate position of the extraction contour that corresponds to the similar condition. The second storage unit 62 stores the coordinate position of the extraction contour whose duty ratio is equal to or more than the duty threshold. The coordinate table 63 stores the coordinate position of the control target portion.

Figure 8A:
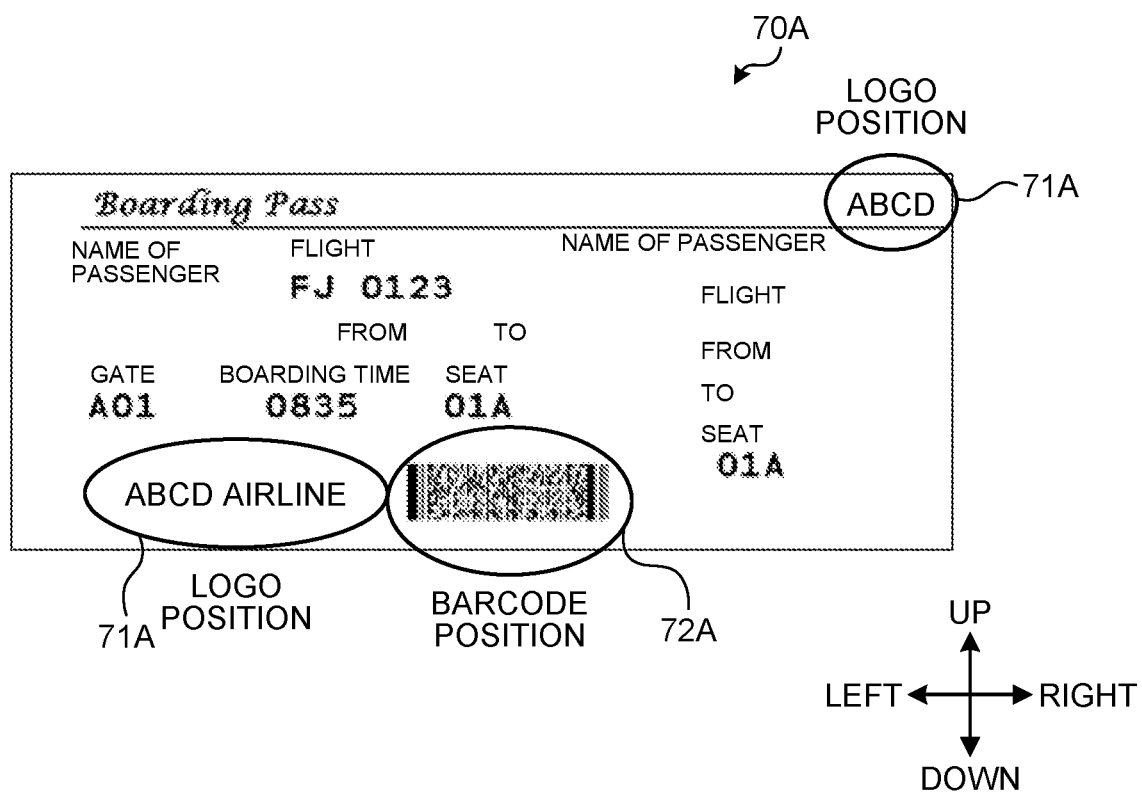
FIG. 8A is an explanatory diagram illustrating an example of a print image of an airline boarding pass.

FIG. 8A is an explanatory diagram illustrating an example of a print image 70A of an airline boarding pass. The print image 70A corresponding to the print image data on the air boarding pass illustrated in FIG. 8A includes a logo 71A near the lower left end, a barcode 72A near the center lower end, and the logo 71A near the upper right end. The logo 71A near the lower left end is, for example, "ABCD airline", and the logo 71A near the upper right end is, for example, "ABCD".

Figure 8B:
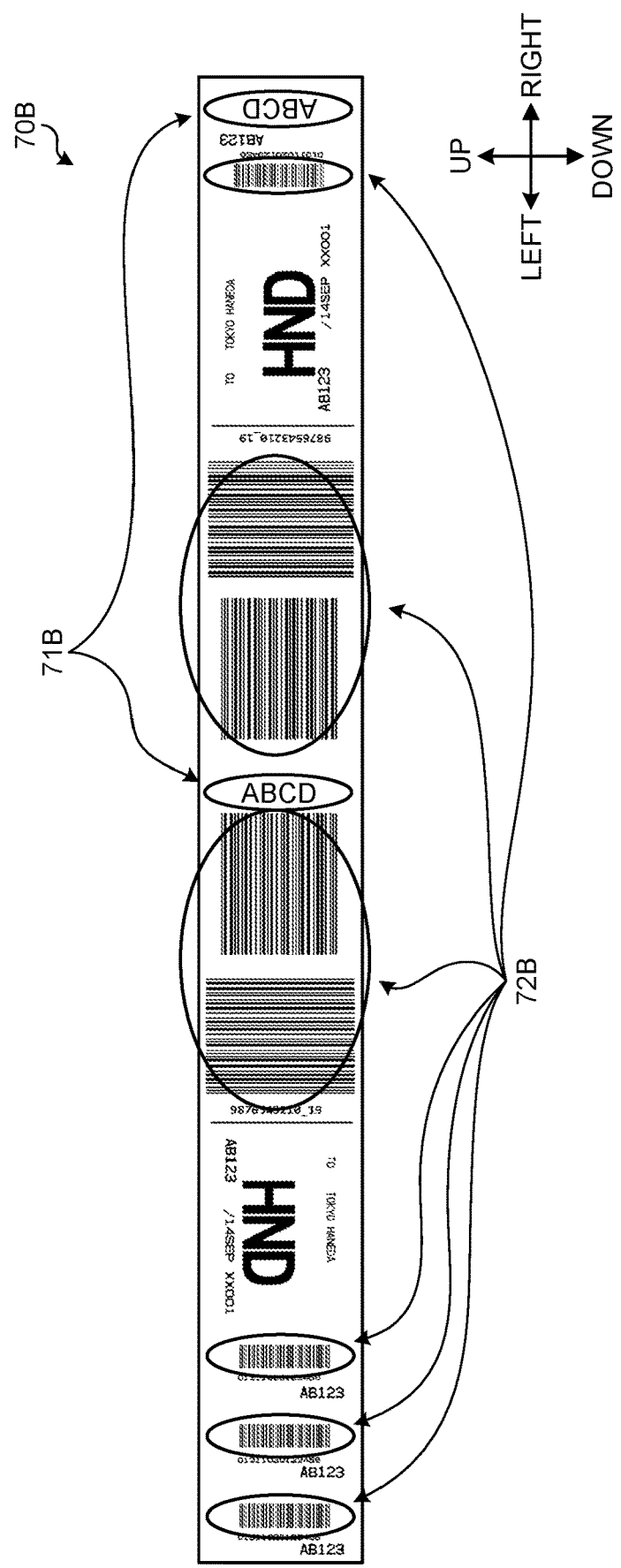
FIG. 8B is an explanatory diagram illustrating an example of a print image of a baggage tag.

FIG. 8B is an explanatory diagram illustrating an example of a print image 70B of a baggage tag. The print image 70B corresponding to the print image data on the baggage tag illustrated in FIG. 8B includes three barcodes 72B near the left side, the four barcodes 72B near the center, the one barcode 72B near the right side, one logo 71B near the center, and the one logo 71B near the right side. The logos 71B near the center and near the right side are, for example, "ABCD".

Description of Morphology Conversion Process

Figure 9:
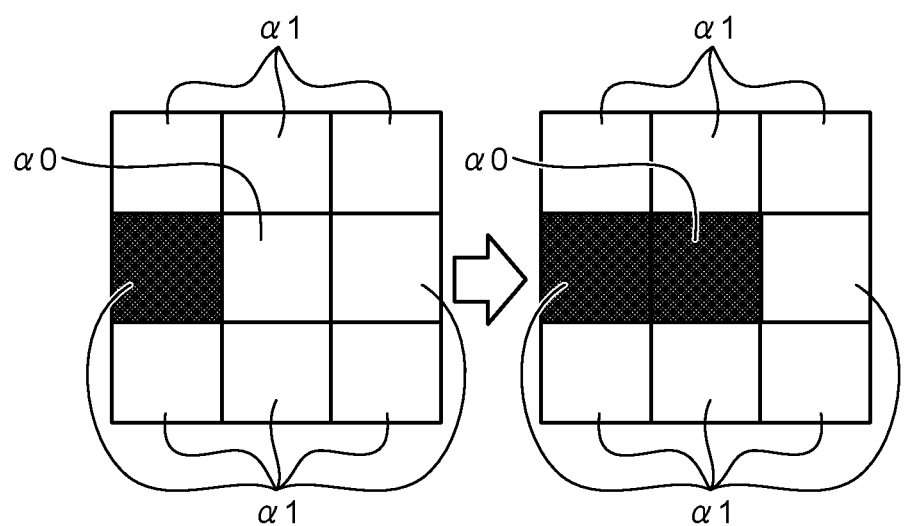
FIG. 9 is an explanatory diagram illustrating an example of a morphology conversion process.

FIG. 9 is an explanatory diagram illustrating an example of the morphology conversion process. The detection unit 52 executes the morphology conversion process on each pixel of the print image corresponding to the print image data. In the morphology conversion process, each pixel of the print image is binarized in white or black and, as illustrated in FIG. 9, it is determined whether there is even one black in eight pixels α1 adjacent to a pixel α0 that is one dot as a determination target. Then, in the morphology conversion process, when there is even one black in the eight pixels α1 adjacent to the pixel α0 as a determination target, the pixel α0 as a determination target is replaced with black.

Figure 10:
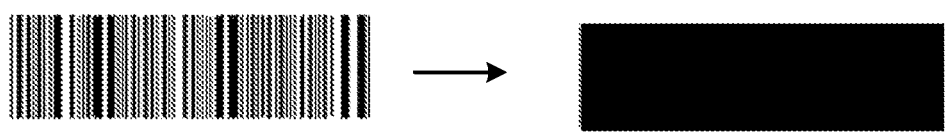
FIG. 10 is an explanatory diagram illustrating an example of the morphology conversion process.

FIG. 10 is an explanatory diagram illustrating an example of the morphology conversion process. In accordance with the line width or the ratio of the barcode, for example, the morphology conversion process is performed multiple times to replace approximately two dots with black, that is, to fill them with black, at one time. As a result, the pixels after the morphology conversion process are filled with black as illustrated in FIG. 10 so that the black area gradually increases.

Description of Contour Extraction Process

Figure 11:
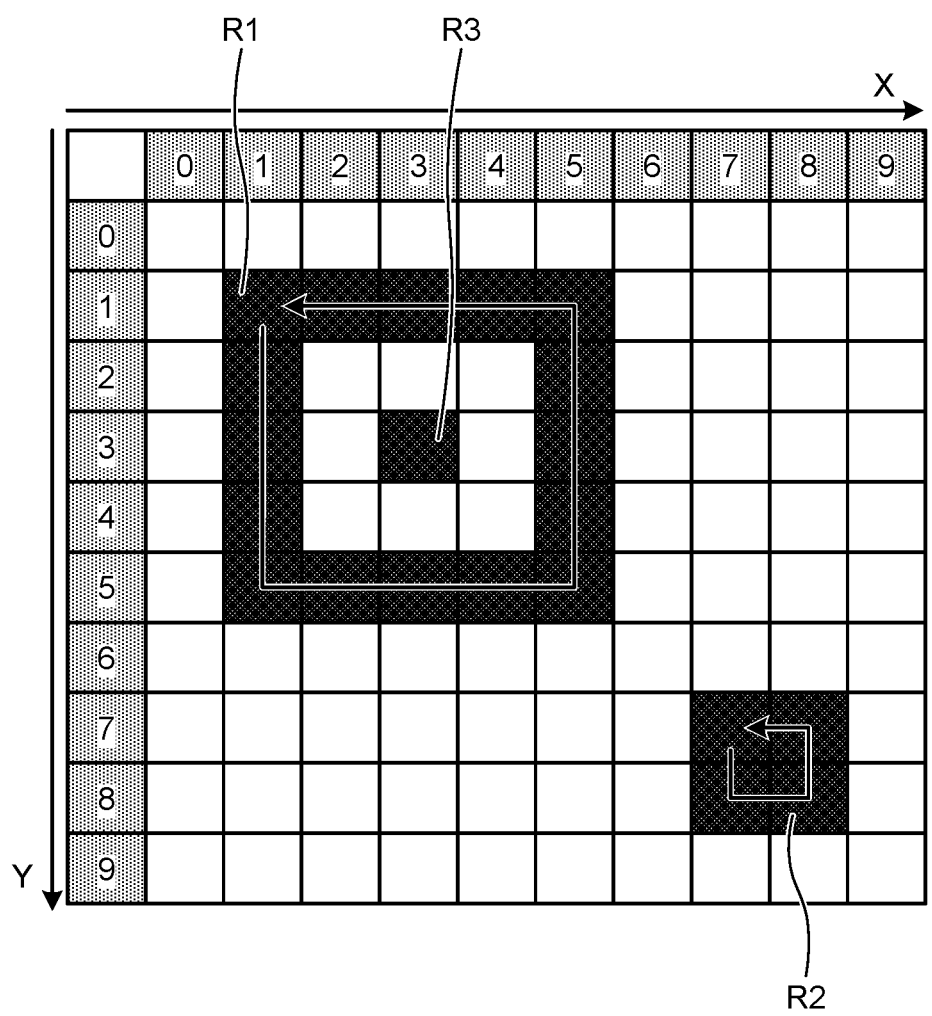
FIG. 11 is an explanatory diagram illustrating an example of a contour extraction process.

FIG. 11 is an explanatory diagram illustrating an example of a contour extraction process. In the contour extraction process, only the outermost contour within the area filled with black in the print image after the morphology conversion is extracted as an extraction contour, and the black-filled area inside the extraction contour is ignored. In the example of FIG. 11, among extraction contours R1, R2, and R3, the extraction contour R3 is excluded from the extraction contours. The detection unit 52 stores, in the first storage unit 61, the coordinate position of the extraction contour whose horizontal and vertical size satisfies the similar condition (4 mm×26 mm) of barcodes and the similar condition (5 mm×5 mm) of logos. Further, the detection unit 52 stores, in the second storage unit 62, the coordinate position of the extraction contour whose duty is equal to or more than the duty threshold (e.g., the proportion of black is 40%) among the extraction contours stored in the first storage unit 61. The detection unit 52 sorts the coordinate positions of the extraction contours in the second storage unit 62 in ascending order of a Y coordinate of the print image.

Figure 12:
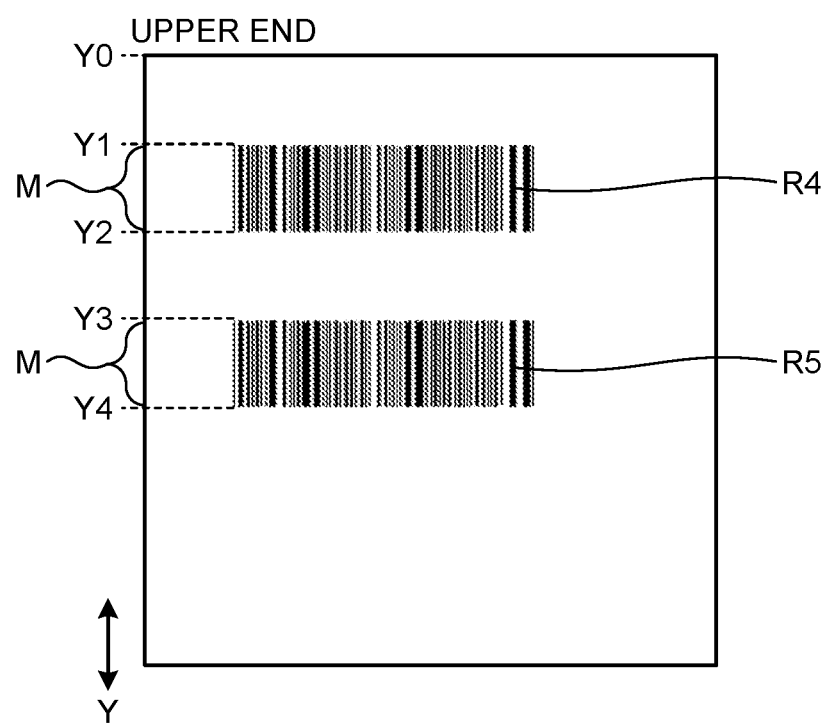
FIG. 12 is an explanatory diagram illustrating an example of print content when a barcode interval in a Y-coordinate direction is equal to or more than a predetermined interval.

FIG. 12 is an explanatory diagram illustrating an example of the print content when a barcode interval in a Y-coordinate direction is equal to or more than a predetermined interval. As illustrated in FIG. 12, the printer unit 3A sequentially executes printing in units of rows in a column direction (Y-coordinate direction) from top to bottom. When the interval between an extraction contour R4 and an extraction contour R5 in the Y-coordinate direction is equal to or more than a predetermined interval, the detection unit 52 determines that the extraction contour R4 and the extraction contour R5 are not on the identical Y coordinate (identical row) and determines that the extraction contour R4 and the extraction contour R5 do not satisfy the single condition of the extraction contours. Then, the detection unit 52 stores, in the coordinate table 63, a portion of the extraction contour R4 from a start Y coordinate Y1 to an end Y coordinate Y2 and a portion of the extraction contour R5 from a start Y coordinate Y3 to an end Y coordinate Y4 as the coordinate positions of separate control target portions M. On the other hand, the coordinate positions of portions other than the control target portions M include a portion from a start Y coordinate Y0 to the start Y coordinate Y1, a portion from the end Y coordinate Y2 to the start Y coordinate Y3, and a portion after the end Y coordinate Y4. The printing control on the coordinate position of the control target portion M is first printing control, and the printing control on the coordinate position of the portion other than the control target portion M is second printing control. The second printing control has the default print speed and print density, whereas the first printing control has a print speed lower than the default print speed and a print density higher than the default print density.

The printer unit 3A in the printing device 3 executes the second printing control to print the portion from the start Y coordinate Y0 to the start Y coordinate Y1, the portion from the end Y coordinate Y2 to the start Y coordinate Y3, and the portion after the end Y coordinate Y4. Further, the printer unit 3A executes the first printing control to print the portion from the start Y coordinate Y1 to the end Y coordinate Y2 and the portion from the start Y coordinate Y3 to the end Y coordinate Y4. That is, the printer unit 3A prints the control target portions M including the logo, barcode, or the like, of the extraction contour R4 and the extraction contour R5 with a high quality and prints the portions other than the control target portions M with the normal quality. As a result, even in the case of printing from the print image data including the specific portion, the print quality of the specific portion may be improved.

Figure 13:
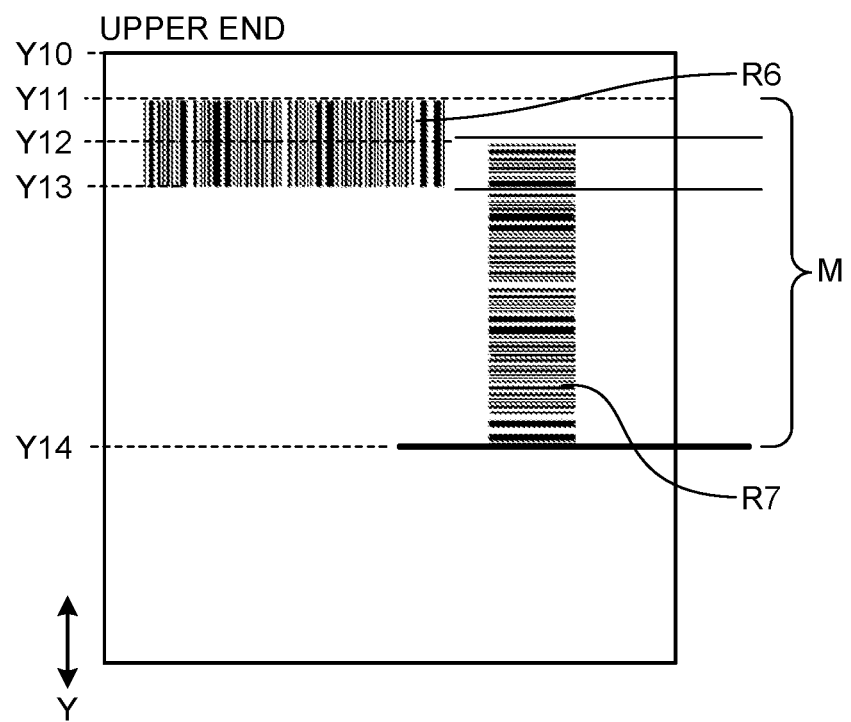
FIG. 13 is an explanatory diagram illustrating an example of print content when multiple barcodes are overlapped on a Y coordinate.

FIG. 13 is an explanatory diagram illustrating an example of the print content when multiple barcodes are overlapped on the Y coordinate. As illustrated in FIG. 13, the detection unit 52 determines that an extraction contour R6 and an extraction contour R7 are overlapped on the Y coordinate and are on the identical Y coordinate (identical row) and determines that the extraction contour R6 and the extraction contour R7 satisfy the single condition of the extraction contours. Then, as the extraction contour R6 and the extraction contour R7 satisfy the single condition, the detection unit 52 determines that they are one extraction contour and determines that a portion from a start Y coordinate Y11 of the extraction contour R6 to an end Y coordinate Y14 of the extraction contour R7 is the coordinate position of the control target portion M. On the other hand, the coordinate positions of the portions other than the control target portion M include a portion from a start Y coordinate Y10 to the start Y coordinate Y11 and a portion after the end Y coordinate Y14.

The printer unit 3A in the printing device 3 executes the second printing control to print the portion from the start Y coordinate Y10 to the start Y coordinate Y11 and the portion after the end Y coordinate Y14. Further, the printer unit 3A executes the first printing control to print the portion from the start Y coordinate Y11 to the end Y coordinate Y14. That is, the printer unit 3A prints the control target portion M including the logo, barcode, or the like, of the extraction contour R6 and the extraction contour R7 with a high quality and prints the portion other than the control target portion M with the normal quality. As a result, even in the case of printing from the print image data including the specific portion, the print quality of the specific portion may be improved.

Figure 14:
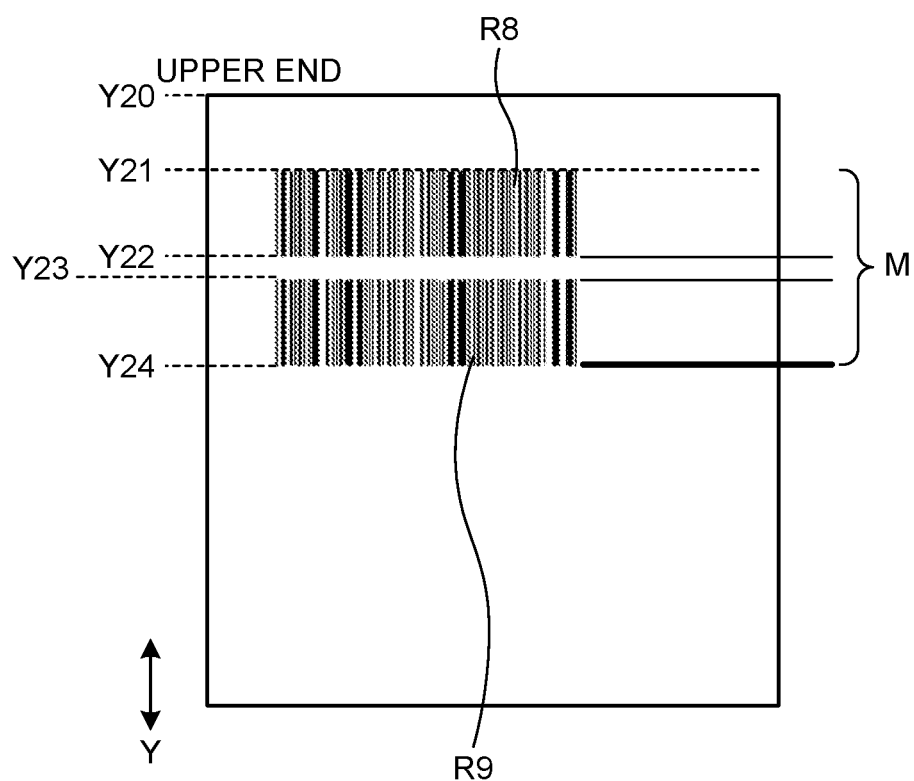
FIG. 14 is an explanatory diagram illustrating an example of print content when a barcode interval in the Y-coordinate direction is less than a predetermined interval.

FIG. 14 is an explanatory diagram illustrating an example of the print content when the barcode interval in the Y-coordinate direction is less than the predetermined interval. When the interval between an extraction contour R8 and an extraction contour R9 in the Y-coordinate direction is less than the predetermined interval, the detection unit 52 determines that the extraction contour R8 and the extraction contour R9 are on the identical Y coordinate (identical row) and determines that the extraction contour R8 and the extraction contour R9 satisfy the single condition of the extraction contours. Then, as the extraction contour R8 and the extraction contour R9 satisfy the single condition, the detection unit 52 determines that they are one extraction contour and determines that a portion from a start Y coordinate Y21 of the extraction contour R8 to an end Y coordinate Y24 of the extraction contour R9 is the coordinate position of the control target portion M. On the other hand, the coordinate positions of the portions other than the control target portion M include the portion from a start Y coordinate Y20 to the start Y coordinate Y21 and a portion after the end Y coordinate Y24.

The printer unit 3A in the printing device 3 executes the second printing control to print the portion from the start Y coordinate Y20 to the start Y coordinate Y21 and the portion after the end Y coordinate Y24. Further, the printer unit 3A executes the first printing control to print the portion from the start Y coordinate Y21 to the end Y coordinate Y24. That is, the printer unit 3A prints the control target portion M including the logo, barcode, or the like, of the extraction contour R8 and the extraction contour R9 with a high quality and prints the portions other than the control target portion M with the normal quality. As a result, even in the case of printing from the print image data including the specific portion, the print quality of the specific portion may be improved.

The detection unit 52 detects the coordinate position of the control target portion M from the print image and stores the coordinate position in the coordinate table 63. Further, the generation unit 53 generates printing control information regarding the first printing control for the coordinate position of the control target portion M. Then, the transmission unit 54 transmits the print image data, the coordinate position of the control target portion M, and the printing control information corresponding to the coordinate position of the control target portion M to the printing device 3.

When the printing device 3 receives the print image data, the coordinate position of the control target portion M, and the printing control information, it specifies the coordinate position of the control target portion M and the coordinate position of the portion other than the control target portion M from the print image data. The printing device 3 specifies the first printing control based on the printing control information for the coordinate position of the control target portion M and the second printing control as default for the coordinate position of the portion other than the control target portion M. The printing device 3 executes the printing control on the print medium based on the first printing control and the second printing control for each coordinate position.

Description of Operation of Overall Printing System 1

Figure 15:
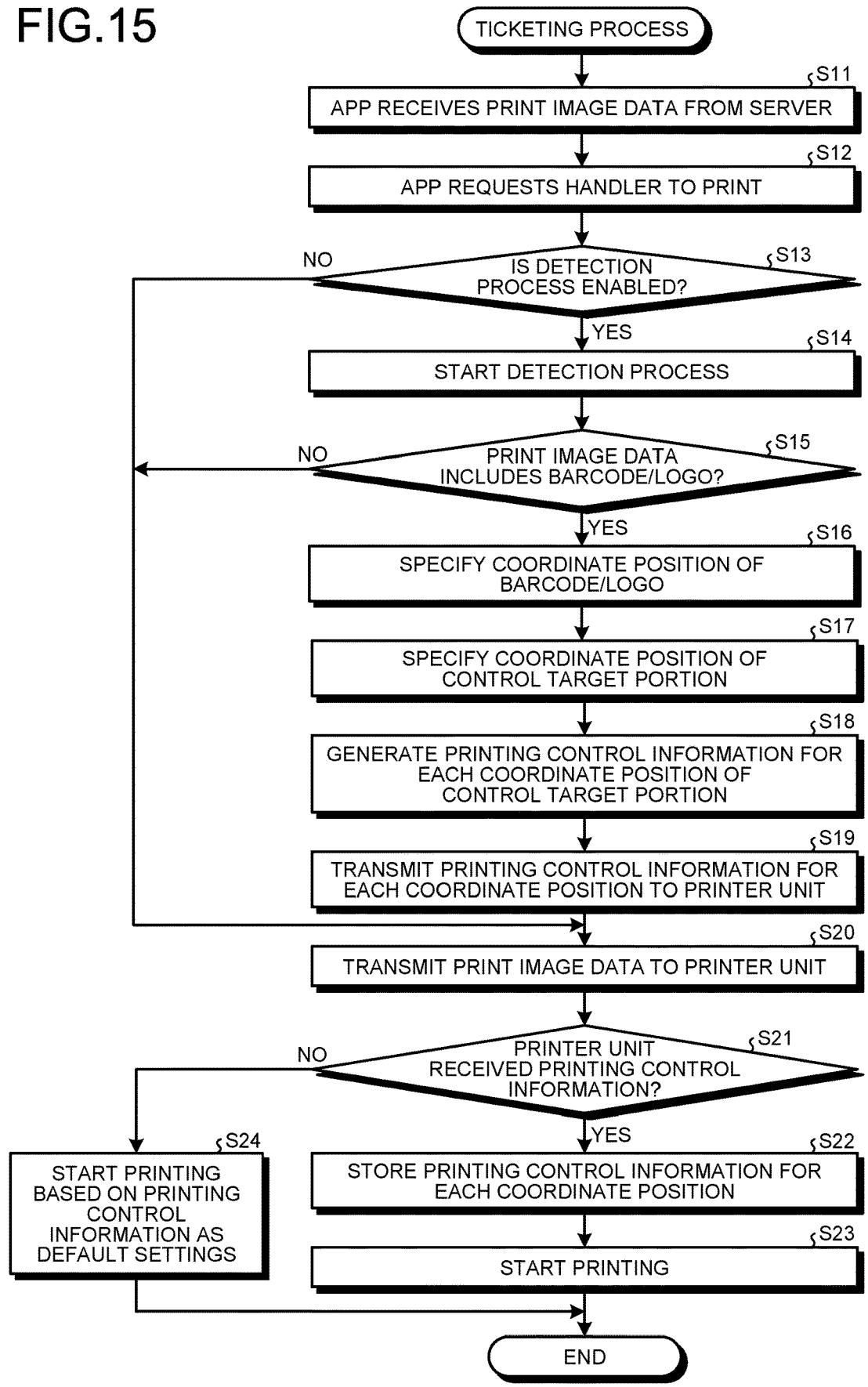
FIG. 15 is a flowchart illustrating an example of a processing operation of the overall printing system regarding a ticketing process.

Next, an operation of the printing system 1 according to the present embodiment is described. FIG. 15 is a flowchart illustrating an example of a processing operation of the printing system 1 regarding a ticketing process. The app 45A in the information processing apparatus 2 receives the print image data from the server 4 (Step S11). Furthermore, for convenience of explanation, the app 45A directly receives the print image data from the server 4 in the case described, but the print image data may be generated from the coordinate, text data, etc., in the customer data received from the server 4, and changes may be made as appropriate. The app 45A requests the handler 45B to make a request for printing the print image data (Step S12).

When the print request is received from the app 45A, the handler 45B in the information processing apparatus 2 determines whether a detection process is enabled (Step S13). Further, the detection process is a process to detect the coordinate position of the control target portion including the specific portion, such as barcode or logo, from the print image data. For example, the detection process is not needed and therefore is disabled when the quality of the print medium is desirable, and the detection process is needed and therefore is enabled when the quality of the print medium is poor. When the detection process is enabled (Step S13: Yes), the handler 45B starts the detection process to detect the coordinate position of the control target portion including the specific portion, such as barcode or logo, in the print image data (Step S14). The handler 45B determines whether the print image data includes the specific portion such as barcode or logo (Step S15).

When the print image data includes the specific portion such as barcode or logo (Step S15: Yes), the handler 45B specifies the coordinate position of the specific portion such as barcode or logo in the print image data (Step S16). The handler 45B specifies the coordinate position of the control target portion from the coordinate position of the specified specific portion (Step S17). Further, the coordinate position of the control target portion is the coordinate position including the specific portion, such as barcode or logo, in the print image data.

The handler 45B generates the printing control information corresponding to the coordinate position of the control target portion, for example, the information on the first printing control such as the print density and the print speed (Step S18). Further, the information on the first printing control is information on the printing control that is higher than the default print density and lower than the default print speed. The handler 45B transmits the printing control information for each coordinate position of the control target portion to the printer unit 3A in the printing device 3 via the USB driver 45C (Step S19). Although the printer unit 3A receives the coordinate position of the control target portion and the printing control information from the handler 45B, the coordinate position of the portion other than the control target portion and the default printing control information on the coordinate position, for example, the second printing control information, are previously registered. Further, the handler 45B transmits the print image data to the printer unit 3A (Step S20).

The printer unit 3A in the printing device 3 determines whether the printing control information (information on the first printing control) for each coordinate position of the control target portion has been received (Step S21). When the printing control information (information on the first printing control) for each coordinate position of the control target portion has been received (Step S21: Yes), the printer unit 3A stores the printing control information (information on the first printing control) for each coordinate position based on the printing control information (information on the first printing control) (Step S22). Specifically, the printer unit 3A stores information on the first printing control such as the print speed and the print density for each coordinate position of the control target portion in the print image data and information on the second printing control for each coordinate position of the portion other than the control target portion in the print image data.

The printer unit 3A starts a printing operation of the print image data based on the information on the first printing control and the information on the second printing control for each coordinate position (Step S23) and ends the processing operation illustrated in FIG. 15. That is, the printer unit 3A increases the print density and decreases the print speed for the control target portion, such as barcode or logo, in the print image data so as to improve the print quality of barcode and logo portions. Further, the printer unit 3A prints a portion other than the barcode and logo portions in the print image data at the default print speed and print density.

Further, when the printing control information for each coordinate position of the control target portion has not been received (Step S21: No), the printer unit 3A starts the printing operation of the print image data based on the information on the second printing control such as the print speed and the print density as default settings (Step S24). Then, the printer unit 3A ends the processing operation illustrated in FIG. 15.

When the detection process is not enabled (Step S13: No), the handler 45B proceeds to Step S20 to transmit the print image data to the printer unit 3A. Further, when there is no specific portion, such as barcode or logo, in the print image data (Step S15: No), the handler 45B proceeds to Step S20 to transmit the print image data to the printer unit 3A.

Description of Operation of Information Processing Apparatus 2

Figure 16:
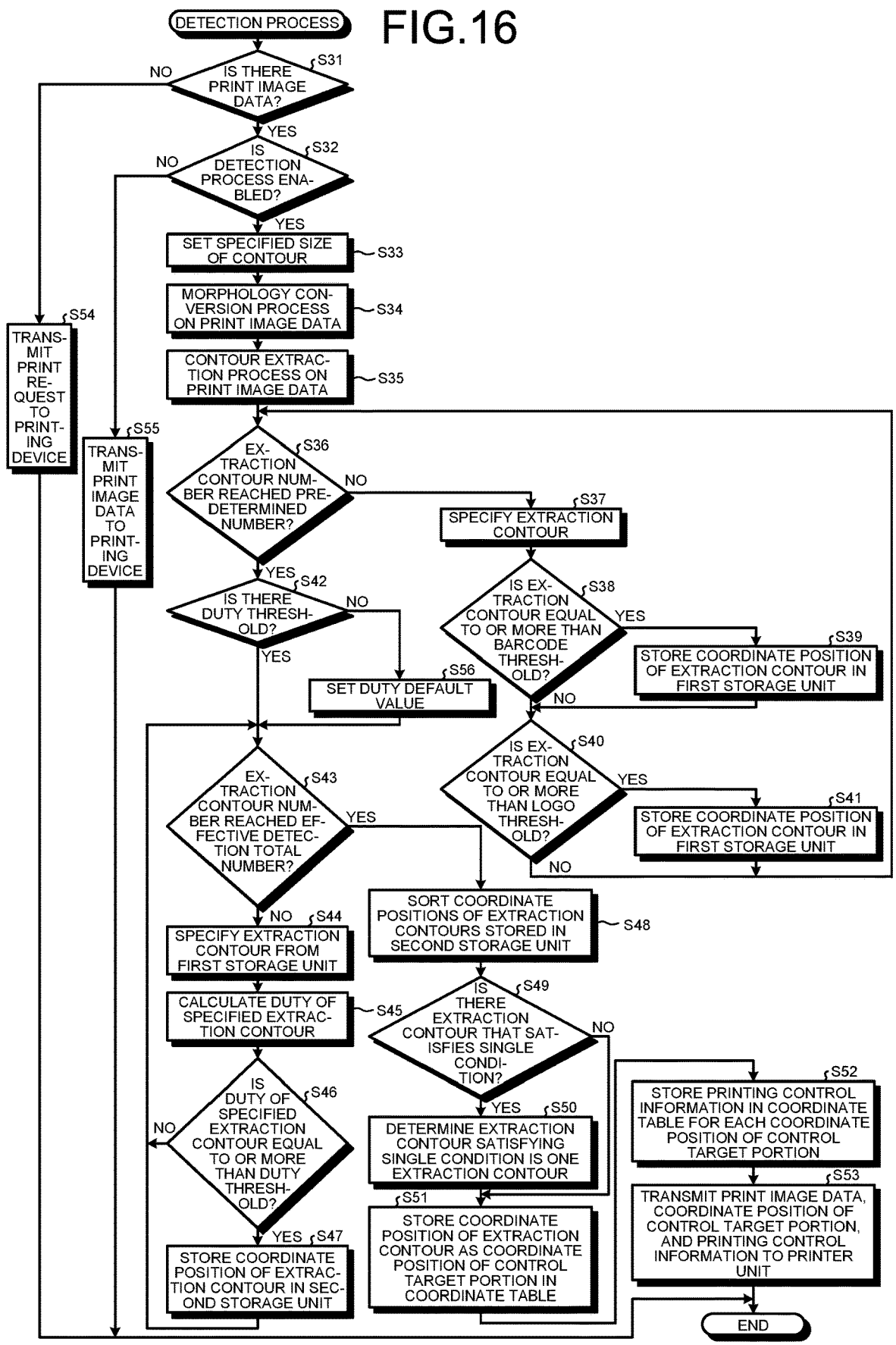
FIG. 16 is a flowchart illustrating an example of a processing operation of the information processing apparatus regarding a detection process.

FIG. 16 is a flowchart illustrating an example of the processing operation of the information processing apparatus 2 regarding the detection process. The handler 45B determines whether there is print image data (Step S31). When there is print image data (Step S31: Yes), the handler 45B determines whether the detection process is enabled to detect the coordinate position of the specific portion, such as barcode or logo, from the print image data (Step S32). When the detection process is enabled (Step S32: Yes), the handler 45B determines whether a specified size of the extraction contour has been set (Step S33). Further, the specified size is a similar condition such as the minimum size of the contour of a barcode or logo in the print image data. For example, the object for the specified size is the width or ratio of a thin line and a thick line in a barcode in the case of a one-dimensional barcode and is the size of one particle in the case of a two-dimensional barcode.

When the specified size has been set (Step S33), the handler 45B executes the morphology conversion process illustrated in FIGS. 9 and 10 on the print image data (Step S34). After the morphology conversion process is executed on the print image data, the handler 45B executes the contour extraction process (see FIG. 11) to extract the extraction contour from the print image data (Step S35). Specifically, after the morphology conversion process and the contour extraction process are executed, the handler 45B specifies the coordinate position of the extraction contour of the similar specific portion such as logo or barcode from the print image data and stores the coordinate position of the specified extraction contour in the first storage unit 61.

After the coordinate position of the extraction contour of the similar specific portion such as logo or barcode is stored in the first storage unit 61, the handler 45B determines whether the number (extraction contour number) of extraction contours stored in the first storage unit 61 has reached a predetermined threshold (Step S36). Further, the predetermined threshold is the total number of specific portions, such as logos and barcodes, previously set in the print image data. When the extraction contour number has not reached the predetermined threshold (Step S36: No), the handler 45B specifies any extraction contour from a plurality of extraction contours (Step S37). The handler 45B determines whether the specified extraction contour is equal to or more than the barcode threshold (Step S38). Further, the barcode threshold is, for example, a similar condition corresponding to the preset minimum size of a barcode. When the specified extraction contour is equal to or more than the barcode threshold (Step S38: Yes), the handler 45B determines that the specified extraction contour is similar to a barcode and stores the coordinate position of the extraction contour in the first storage unit 61 (Step S39). Furthermore, when the extraction contour is not equal to or more than the barcode threshold (Step S38: No), the handler 45B determines that the specified extraction contour is not similar to a barcode and determines whether the specified extraction contour is equal to or more than the logo threshold (Step S40). Moreover, the logo threshold is, for example, a similar condition corresponding to the preset minimum size of a logo.

When the specified extraction contour is equal to or more than the logo threshold (Step S40: Yes), the handler 45B determines that the extraction contour is similar to a logo and stores the coordinate position of the specified extraction contour in the first storage unit 61 (Step S41). Then, the handler 45B proceeds to Step S36 to determine whether the extraction contour number has reached the predetermined threshold.

When the extraction contour number has reached the predetermined threshold (Step S36: Yes), the handler 45B determines whether there is a duty threshold (Step S42). Further, as for the duty threshold, for example, the proportion of black is 40%. When there is a duty threshold (Step S42: Yes), the handler 45B determines whether the extraction contour number has reached an effective detection number (Step S43). Moreover, the effective detection number is the total number of specific portions in the preset print image data.

When the extraction contour number has not reached the valid detection number (Step S43: No), the handler 45B specifies the extraction contour (Step S44). The handler 45B calculates the duty of the specified extraction contour (Step S45). Further, the duty of the extraction contour is the ratio between black and white of the extraction contour at the extracted coordinates after extracting the coordinates of the extraction contour from the print image data. The handler 45B determines whether the duty of the specified extraction contour is equal to or more than the duty threshold (Step S46).

When the duty of the specified extraction contour is equal to or more than the duty threshold (Step S46: Yes), the handler 45B determines that the specified extraction contour is a specific portion such as barcode or logo and stores the coordinate position of the extraction contour in the second storage unit 62 (Step S47). Further, after storing the coordinate position of the extraction contour in the second storage unit 62, the handler 45B proceeds to Step S43 to determine whether the extraction contour number of the extraction contours stored in the second storage unit 62 has reached the effective detection number. When the duty of the extraction contour is not equal to or more than the duty threshold (Step S46: No), the handler 45B determines that the specified extraction contour is not a specific portion such as barcode or logo and proceeds to Step S43 to determine whether the extraction contour number has reached the effective detection number.

When the extraction contour number has reached the effective detection number (Step S43: Yes), the handler 45B sorts the coordinate positions of the extraction contours that are stored in the second storage unit 62 and have equal to or more than the duty threshold (Step S48). The handler 45B determines whether there is an extraction contour that satisfies the single condition among the sorted extraction contours (Step S49). The handler 45B determines that the extraction contour satisfying the single condition is one extraction contour (Step S50).

The handler 45B determines that the coordinate position of the extraction contour that is stored in the second storage unit 62 and satisfies the single condition or the coordinate position of the extraction contour that does not satisfy the single condition is the coordinate position of the control target portion and stores the coordinate position of the control target portion in the coordinate table 63 (Step S51). Specifically, the handler 45B sorts the coordinate positions of the extraction contours of the sorted control target portions stored in the coordinate table 63 in ascending order. Further, the handler 45B stores the printing control information (information on the first printing control) in the coordinate table 63 for each coordinate position of the control target portion (Step S52). Further, the handler 45B transmits the coordinate position of the control target portion stored in the coordinate table 63, the printing control information (information on the first printing control), and the print image data to the printing device 3 (Step S53) and ends the processing operation illustrated in 16. That is, the printer unit 3A in the printing device 3 sorts the sorted coordinate positions of the extraction contours in ascending order to start printing.

When there is no print image data (Step S31: No), the handler 45B transmits a normal print request to the printing device 3 (Step S54) and ends the processing operation illustrated in FIG. 16. When the detection process is not enabled (Step S32: No), the handler 45B transmits the print image data to the printing device 3 (Step S55) and ends the processing operation illustrated in FIG. 16.

When there is no duty threshold (Step S42: No), the handler 45B sets the duty default value as a duty threshold (Step S56) and proceeds to Step S43 to determine whether the extraction contour number has reached the effective detection number.

Description of Operation of Printing Device 3

Figure 17:
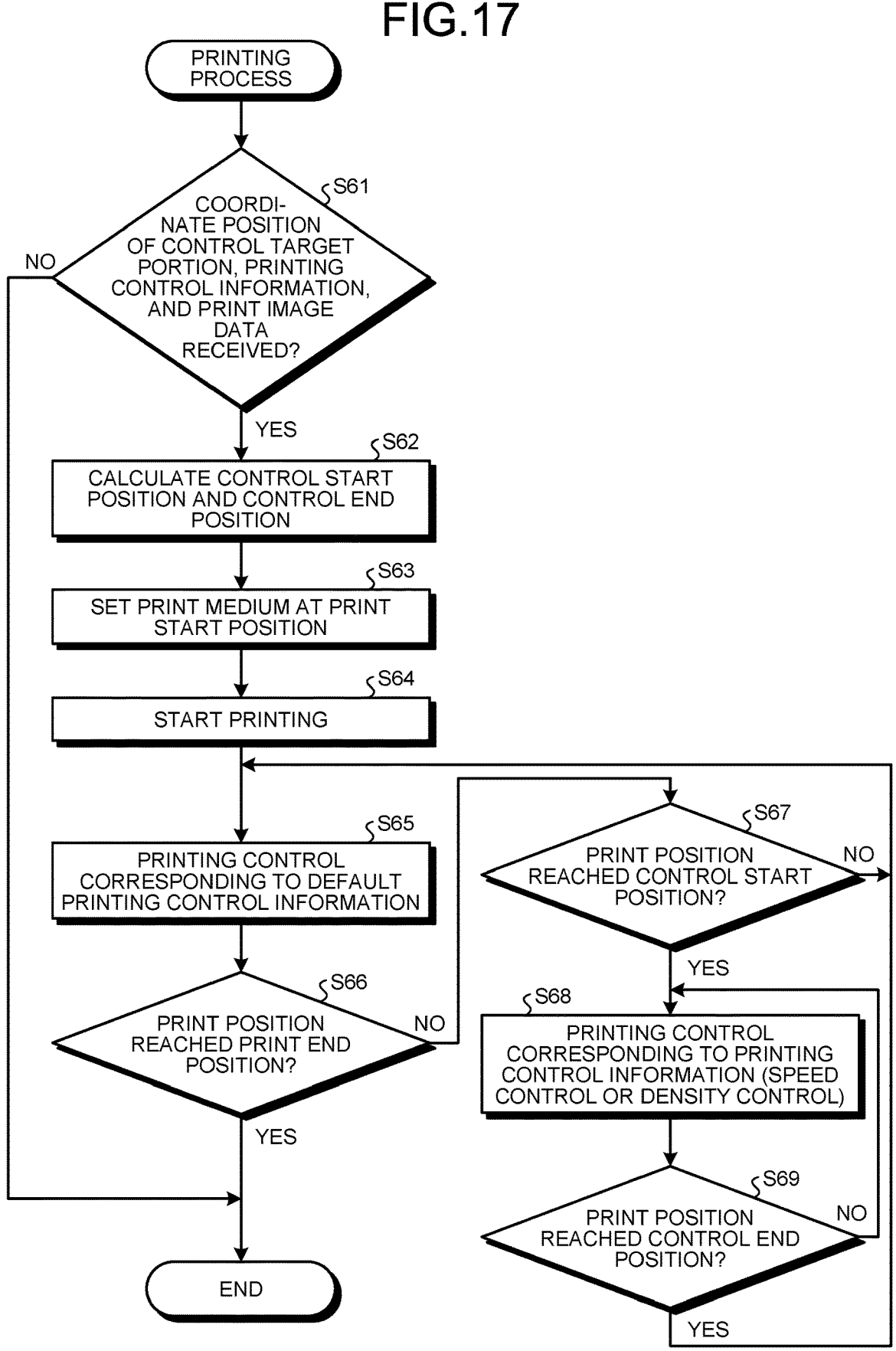
FIG. 17 is a flowchart illustrating an example of a processing operation of the printing device regarding a printing process.

FIG. 17 is a flowchart illustrating an example of the processing operation of the printing device 3 regarding a printing process. The printer unit 3A in the printing device 3 determines whether the coordinate position of the control target portion, the printing control information, and the print image data have been received from the information processing apparatus 2 (Step S61). Further, the printing control information is the information on the first printing control for the coordinate position of the control target portion. When the coordinate position of the control target portion, the printing control information, and the print image data have been received (Step S61: Yes), the printer unit 3A calculates a control start position and a control end position from the coordinate position of the control target portion (Step S62). Further, for example, when the coordinate position of the control target portion is as in FIG. 14, the control start position is the start Y coordinate Y21 of the extraction contour R8 of the control target portion, and the control end position is the end Y coordinate Y24 of the extraction contour R9 of the control target portion. After the control start position and the control end position of all the control target portions in the print image are calculated, the printer unit 3A stores the information on the first printing control and the information on the second printing control for each control start position and control end position. Further, the printer unit 3A sets the print medium at a print start position (Step S63) and starts printing on the print medium at the print start position (Step S64). Moreover, the print start position is, for example, the start position of the print content corresponding to the print image data.

After printing on the print medium starts, the printer unit 3A executes the printing control corresponding to the default printing control information (Step S65). After executing the printing control corresponding to the default printing control information, the printer unit 3A determines whether the print position has reached the print end position (Step S66). Further, the print position is, for example, the print position in the middle of the current printing by the thermal head 26. The print end position is, for example, the end position of the print content corresponding to the print image data. When the print position has reached the print end position (Step S66: Yes), the printer unit 3A ends the processing operation illustrated in FIG. 17.

When the print position has not reached the print end position (Step S66: No), the printer unit 3A determines whether the print position has reached the control start position (Step S67). When the print position has reached the control start position (Step S67: Yes), the printer unit 3A executes the printing control corresponding to the printing control information (information on the first printing control) (Step S68). Specifically, when the control start position has been reached, the printer unit 3A executes the first printing control for the coordinate position of the control target portion, that is, increases the print density and decreases the print speed. Further, the printer unit 3A determines whether the print position has reached the control end position during execution of the printing control corresponding to the printing control information at Step S68 (Step S69).

When the print position has reached the control end position (Step S69: Yes), the printer unit 3A proceeds to Step S65 to execute the printing control corresponding to the default printing control information. Further, when the print position has not reached the control start position (Step S67: No), the printer unit 3A proceeds to Step S65 to execute the printing control corresponding to the default printing control information. When the print position has not reached the control end position (Step S69: No), the printer unit 3A proceeds to Step S68 to execute the printing control corresponding to the printing control information.

Description of Effect of Embodiment

The information processing apparatus 2 detects the control target portion including the specific portion, such as barcode or logo, from the print image data and transmits, to the printing device 3, the printing control information (information on the first printing control) for increasing the print density and decreasing the print speed for only the control target portion on the print medium. As a result, the printing device 3 may improve the print quality of the specific portion even when printing is executed from the print image data including the specific portion. Furthermore, as the printing device 3 decreases the print speed for only the control target portion including the specific portion, it is possible to prevent a significant reduction in the print speed of the entire print medium. Moreover, as the printing device 3 increases the print density for only the control target portion, the effect on the life of the thermal head 26 may be reduced.

The detection unit 52 extracts the contour of the specific portion from the print image data based on the similar condition that is similar to the specific portion and detects the position of the specific portion from the extracted contour. As a result, the information processing apparatus 2 may detect the position of the control target portion including the specific portion from the print image data.

The detection unit 52 binarizes each pixel of the print image, executes the morphology conversion process on each binarized pixel, then extracts the contour from the pixels after the morphology conversion process, and detects the position of the specific portion from the extracted contour. As a result, the information processing apparatus 2 may accurately detect the position of the control target portion including the specific portion from the print image data.

The detection unit 52 detects the contour as the position of the specific portion when the duty ratio between one value and the other value out of two values of each pixel of the extracted contour is equal to or more than a predetermined duty threshold. As a result, the information processing apparatus 2 may detect the position of the control target portion including the specific portion from the print image data with high accuracy.

The generation unit 53 generates, as the printing control information for each position of the specific portion, the information on the first printing control for performing control to increase the print density so as to be different from the portion other than the specific portion when printing is executed by the thermal head 26. As a result, the printing device 3 increases the print density for the specific portion so as to improve the print quality of the specific portion.

The generation unit 53 generates, as the printing control information for each position of the specific portion, the information on the first printing control for performing control to decrease the print speed so as to be different from the portion other than the specific portion when printing is executed by the thermal head 26. As a result, the printing device 3 decreases the print speed for the specific portion so as to improve the print quality of the specific portion.

The information processing apparatus 2 enables the detection process in the case of a print medium having a poor print quality. As a result, the printing device 3 may improve the print quality of the specific portion even when printing is executed from the print image data including the specific portion even on the print medium having a poor print quality. Further, the information processing apparatus 2 disables the detection process in the case of a print medium having a desirable print quality. Accordingly, the print speed is the same as that of the conventional model.

The information processing apparatus 2 transmits the coordinate position of the control target portion, the information on the first printing control for each coordinate position of the control target portion, and the print image data to the printing device 3. The printing device 3 controls printing of the control target portion based on the coordinate position of the control target portion acquired from the information processing apparatus 2 and the information on the first printing control for each coordinate position of the control target portion. As a result, the printing device 3 may improve the print quality of the specific portion without changing the hardware configuration.

Although the printing device 3 according to the present embodiment is illustrated as an airline printer, or the like, which issues an airline boarding pass, etc., it may be, for example, a receipt printing device that issues a receipt, or the like, and may be changed as appropriate.

Furthermore, each component of each unit illustrated does not always need to be physically configured as illustrated. Specifically, specific forms of separation/integration of units are not limited to the one illustrated, and all or some of them may be functionally or physically configured to be separated/integrated in any unit in accordance with various loads or usage conditions.

Furthermore, all or any part of various processing functions performed by each device may be executed on a CPU (Central Processing Unit) (or microcomputer such as MPU (Micro Processing Unit) or MCU (Micro Controller Unit)). Further, it is obvious that all or any part of various processing functions may be executed on a program analyzed and executed by a CPU (or microcomputer such as MPU or MCU) or wired logic hardware.

According to one aspect, the object is to provide a printing system, and the like, which may improve the print quality of the specific portion even when printing is executed from the print image data including the specific portion.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

The invention claimed is:

1. A printing system comprising:
a printing device including a thermal head that prints print content on a print medium; and
an information processing apparatus that controls the printing device, the information processing apparatus comprises a processor configured to:
execute a detecting to detect, from print image data from a server, a position of a control target portion including a specific portion in a print image corresponding to the print image data, when a quality of the print medium is less than a determined level;
execute a generating to generate printing control information for printing the control target portion; and transmit the print image data, the position of the control target portion, and the printing control information, to the printing device, wherein to detect the position of the control target position, the processor is configured to,
binarize each pixel of pixels of the print image,
execute a morphology conversion process on each binarized pixel,
extract a contour from the pixels after the morphology conversion process,
detect a position of the specific portion from the extracted contour, and
detect the contour as the position of the specific portion when a duty ratio between one value and other value out of two values of each pixel of the extracted contour is equal to or more than a determined duty threshold, to detect the position of the control target portion including the specific portion, and wherein the printing device executes different printing controls for the control target portion and a portion other than the control target portion based on the print image data, the position of the control target portion, and the printing control information.

2. The printing system according to claim 1, wherein the detecting detects the position of the control target portion including the specific portion and a portion in an identical row to the specific portion when the printing device sequentially prints the print content on the print medium in units of rows in a column direction.

3. The printing system according to claim 1, wherein the detecting extracts a contour of the specific portion from the print image data based on a similar condition that is similar to the specific portion, detects a position of the specific portion from the extracted contour, and detects the position of the control target portion including the specific portion.

4. The printing system according to claim 1, wherein the generating generates, as the printing control information for each position of the control target portion including the specific portion, control information for controlling the printing device to increase a print density for printing the control target portion when the printing device prints the control target portion.

5. The printing system according to claim 1, wherein the generating generates, as the printing control information for each position of the control target portion including the specific portion, control information for controlling the printing device to decrease a print speed for printing the control target portion when the printing device prints the control target portion.

6. A printing control method by a printing system including: a printing device including a thermal head that prints print content on a print medium; and an information processing apparatus that controls the printing device, the printing control method comprising:

by the information processing apparatus,
detecting, from print image data from a server, a position of a control target portion including a specific portion in a print image corresponding to the print image data, when a quality of the print medium is less than a determined level;
generating printing control information for printing the control target portion; and
transmitting the print image data, the position of the control target portion, and the printing control information to the printing device, wherein the detecting,
binarizes each pixel of pixels of the print image,
executes a morphology conversion process on each binarized pixel,
extracts a contour from the pixels after the morphology conversion process,
detects a position of the specific portion from the extracted contour, and
detects the contour as the position of the specific portion when a duty ratio between one value and other value out of two values of each pixel of the extracted contour is equal to or more than a determined duty threshold, to detect the position of the control target portion including the specific portion; and by the printing device, executing different printing controls for the control target portion and a portion other than the control target portion based on the print image data, the position of the control target portion, and the printing control information.

7. An information processing apparatus that controls a printing device including a thermal head that prints print content on a print medium, the information processing apparatus comprising a processor configured to:

executing a detecting to detect, from print image data from a server, a position of a control target portion including a specific portion in a print image corresponding to the print image data, when a quality of the print medium is less than a determined level;
generate printing control information for printing the control target portion; and
transmit the print image data, the position of the control target portion, and the printing control information to the printing device, wherein to detect the position of the control target portion, the processor is configured to,
binarize each pixel of pixels of the print image,
execute a morphology conversion process on each binarized pixel,
extract a contour from the pixels after the morphology conversion process,
detect a position of the specific portion from the extracted contour, and
detect the contour as the position of the specific portion when a duty ratio between one value and other value out of two values of each pixel of the extracted contour is equal to or more than a determined duty threshold, to detect the position of the control target portion including the specific portion.

* * * * *